United States Patent
Kobori

(10) Patent No.: US 10,534,974 B2
(45) Date of Patent: Jan. 14, 2020

(54) IMAGE AREA EXTRACTION METHOD AND STORAGE PROGRAM

(71) Applicant: TOYOTA JIDOSHA KABUSHIKI KAISHA, Toyota-shi, Aichi-ken (JP)

(72) Inventor: Norimasa Kobori, Nagoya (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 200 days.

(21) Appl. No.: 15/864,111

(22) Filed: Jan. 8, 2018

(65) Prior Publication Data

US 2018/0225543 A1 Aug. 9, 2018

(30) Foreign Application Priority Data

Feb. 9, 2017 (JP) ................................ 2017-022107

(51) Int. Cl.
*G06K 9/00* (2006.01)
*G06K 9/46* (2006.01)
*G06T 7/136* (2017.01)
*G06T 11/60* (2006.01)
*H04N 1/60* (2006.01)

(52) U.S. Cl.
CPC ............ *G06K 9/4652* (2013.01); *G06T 7/136* (2017.01); *G06T 11/60* (2013.01); *H04N 1/6016* (2013.01); *G06K 9/4604* (2013.01); *G06T 2207/10024* (2013.01)

(58) Field of Classification Search
CPC .... G06K 9/4652; G06K 9/4604; G06T 7/136; G06T 11/60; G06T 2207/10024; H04N 1/6016
See application file for complete search history.

(56) References Cited

U.S. PATENT DOCUMENTS

2010/0086218 A1* 4/2010 Tateno ............... G06K 9/00208
382/203
2011/0158519 A1* 6/2011 Zhao .................... G06K 9/4642
382/165

FOREIGN PATENT DOCUMENTS

JP 2010-079452 A 4/2010

OTHER PUBLICATIONS

Carsten Rother et al.,"GrabCut"—Interactive Foreground Extraction using Iterated Graph Cuts, Conference on Computer Graphics and Interactive Techniques (SIGGRAPH), 2004, 6 pages.

* cited by examiner

Primary Examiner — Ping Y Hsieh
(74) Attorney, Agent, or Firm — Sughrue Mion, PLLC

(57) ABSTRACT

Provided is an image area extraction method for extracting an image area of an object from a color image of obtained color image data. The image data extraction method includes converting RGB values of each pixel in the color image data into HSV values, performing threshold processing to binarize at least one of the converted S and V values of each pixel so that it will be converted into HS'V' values, generating composite image data including an X value, a Y value, and a Z value for each pixel, the X value, the Y value, and the Z value being obtained by adding values according to predetermined one-to-one combinations between any one of an R value, a G value, and a B value and any one of an H value, an S' value, and a V' value, and extracting the image area using the composite image data.

5 Claims, 5 Drawing Sheets

100 RGB IMAGE

300 HS'V' IMAGE

400 COMPOSITE IMAGE

IMAGE AREA EXTRACTION METHOD AND STORAGE PROGRAM

CROSS REFERENCE TO RELATED APPLICATIONS

This application is based upon and claims the benefit of priority from Japanese patent application No. 2017-22107, filed on Feb. 9, 2017, the disclosure of which is incorporated herein in its entirety by reference.

BACKGROUND

The present disclosure relates to an image area extraction method and an image area extraction program.

A technique for detecting a posture and the like of an object placed under a three-dimensional environment is known. For example, when a robot hand intends to grasp a holding object, information such as a posture of the article is required in advance. Attempts have been made to obtain such information using image data obtained by capturing an image of the object. For example, there is a known technique of planarizing a three-dimensional model of the object and comparing the three-dimensional model with a captured image in order to identify the object (see, for example, Japanese Unexamined Patent Application Publication No. 2010-079452).

SUMMARY

It may be difficult to distinguish an object from its background in the captured image depending on the object. For example, there is a background inside an annular handle of a cup. Thus, the object cannot be recognized accurately only by cutting out an outer contour of the cup.

The present disclosure has been made to solve such a problem. The present disclosure provides an image area extraction method and an image area extraction program for accurately extracting an area of an object from a captured image.

A first example aspect of the present disclosure is an image area extraction method for extracting an image area of an object from a color image of obtained color image data. The image data extraction method includes: converting RGB values of each pixel in the color image data into HSV values; performing threshold processing to binarize at least one of the converted S and V values of each pixel so that it will be converted into HS'V' values; generating composite image data including an X value, a Y value, and a Z value for each pixel, the X value, the Y value, and the Z value being obtained by adding values according to predetermined one-to-one combinations between any one of an R value, a G value, and a B value and any one of an H value, an S' value, and a V' value; and extracting the image area using the composite image data.

In this way, the color information including red, green, and blue according to RGB as components is combined with the color information including hue, saturation, and lightness according to HSV as components. Thus, it is possible to accurately perform area extraction that is difficult by using only one of the color information. In particular, as threshold processing for binarizing at least one of the S value and the V value is performed, information of at least one of the saturation or lightness is emphasized, thereby greatly improving the accuracy of the area segmentation.

In the above image area extraction method, in the generating, the RGB values and HS'V' values may be multiplied by weighting coefficients and then added to one another. When the values are multiplied by the weighting coefficients, it is possible to change which of RGB and HS'V' is handled as important information, for example, according to the type of an object and imaging environment. Further, the weighting coefficients may be changed based on histograms of the RGB values. For example, if the weighting coefficients are changed based on respective distributions of the RGB values, it is possible to further improve the extraction accuracy according to the colors of the object.

In the extracting, the image area may be extracted by a graph cut method. It has been found that in the composite image data generated through such processing, areas can be extracted with high accuracy by the graph cut method.

A second example aspect of the present disclosure is a non-transitory computer readable medium storing an image area extraction program for extracting an image area of an object from a color image of obtained color image data. The image area extraction program causes a computer to execute: converting RGB values of each pixel in the color image data into HSV values; performing threshold processing to binarize at least one of the converted S and V values of each pixel so that it will be converted into HS'V' values; generating composite image data including an X value, a Y value, and a Z value for each pixel, the X value, the Y value, and the Z value being obtained by adding values according to one-to-one combinations between any one of an R value, a G value, and a B value and any one of an H value, an S' value, and a V' value; and extracting the image area using the composite image data.

In this way, the color information including red, green, and blue according to RGB as components is combined with the color information including hue, saturation, and lightness according to HSV as components. Thus, it is possible to accurately perform area extraction that is difficult by using only one of the color information. In particular, as threshold processing for binarizing at least one of the S value and the V value is performed, information of at least one of the saturation or lightness is emphasized, thereby greatly improving the accuracy of the area segmentation.

According to the present disclosure, it is possible to provide an image area extraction method and an image area extraction program that accurately extract an area of an object from a captured image.

The above and other objects, features and advantages of the present invention will become more fully understood from the detailed description given hereinbelow and the accompanying drawings which are given by way of illustration only, and thus are not to be considered as limiting the present invention.

DESCRIPTION OF EMBODIMENTS

Hereinafter, although the present disclosure will be described with reference to embodiments of the invention, the present disclosure according to claims is not limited to the following embodiment. Moreover, all the components described in the following embodiments are not necessarily indispensable for means to solve problems.

An image area extraction method according to this embodiment is executed by, for example, a production robot including a robot hand. The image area extraction method is executed as preprocessing for planning and performing an appropriate holding action when the robot hand holds an object. Specifically, by executing the extraction method, the production robot recognizes a posture and the like of the object to be held. By executing such preprocessing, the production robot can hold the object at a position and with an angle suitable for a structure of the robot hand and the like.

In addition to the robot hand, the production robot includes an imaging unit and a calculation unit. The imaging unit captures the space where the object to be held is present as a field of view. The calculation unit executes control on the entire robot and executes various calculations. The calculation unit executes the control on the entire robot and various calculations by executing programs stored in a storage apparatus included in the robot or programs supplied via a network. The calculation unit further executes the control on the entire robot and various calculations as necessary using databases and parameters stored in the storage apparatus included in the robot or databases and parameters supplied via the network. The image area extraction method according to this embodiment is also executed by the calculation unit. The calculation unit is composed of, for example, one or more CPUs. Note that the imaging unit may not be included in the production robot and instead may be fixed to a ceiling or the like as long as it can capture an image of the object. In this case, captured image data is taken in by the production robot via the network.

An example of extracting an area of the object from the image and utilizing the extracted area is not limited to the production robot as a matter of course. The image area extraction method according to this embodiment is a technique that can be utilized in various situations. In the following embodiments, an example will be described in which the above-described production robot executes the image area extraction method as preprocessing for holding the cup.

Figure 1:
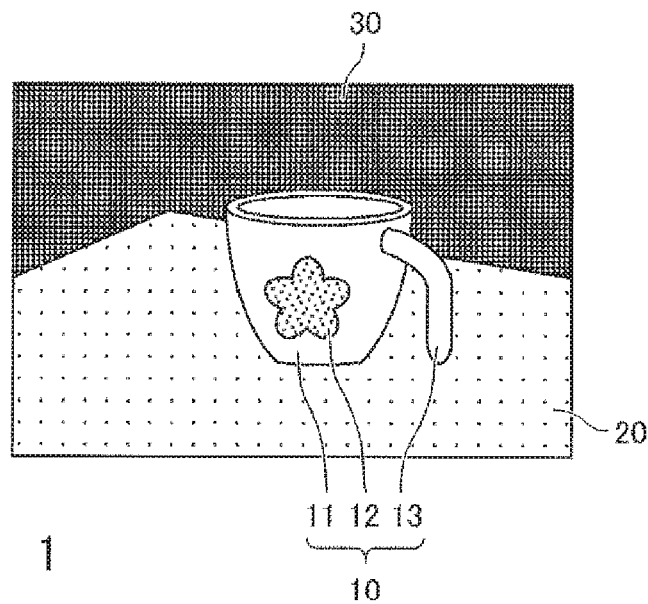
FIG. 1 is a diagram schematically showing an example of an RGB image obtained from an imaging unit.

FIG. 1 is a diagram schematically showing an example of an RGB image obtained from the imaging unit. The RGB image is a color image including R, G, and B values for each pixel as color information. The R value is a pixel value of red, the G value is a pixel value of green, and the B value is a pixel value of blue.

An image sensor included in the imaging unit is, for example, a color image sensor in which any one of RGB color filters is arranged in the Bayer layout on each two-dimensionally arranged pixel. The image sensor photoelectrically converts an optical image of the object formed by an optical system and outputs a color image signal. An image processing unit of the imaging unit adjusts each pixel so that it will have each of the R value, G value, and B value by interpolation processing that uses an output of a surrounding pixel signal and passes the pixels to the calculation unit as RGB image data.

An RGB image 100 includes a cup 10, which is a subject, a table 20 on which the cup 10 is placed, and a wall surface 30 behind the table 20. The cup 10 is composed of a body part 11, a pattern 12 drawn on a surface of the body part 11, and a handle 13. Due to limitations of the drawings, in each drawing of this embodiment, differences in color and luminance and the like when image data is visualized as an image are schematically indicated by differences in fine lines, dots, density, or the like. In the example of FIG. 1, it is shown that the colors of the main body 11 and the handle 13 of the cup 10 are similar to the color of the table 20. It is also shown that the color of the wall surface 30 is largely different from the colors of the body part 11 and the handle 13 of the cup 10 and the color of the table 20.

Figure 2:
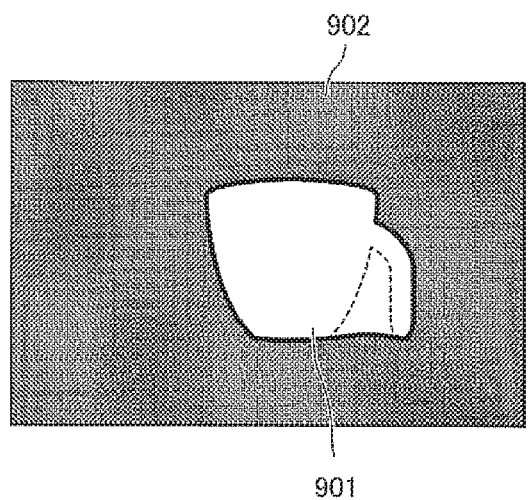
FIG. 2 is a diagram schematically showing an example of a case where an area is extracted from the RGB image.

FIG. 2 is a segmented image 900 showing a result of extracting an area from the RGB image 100 directly using the R values, G values, and B values. The segmented image 900 is segmented into an extracted area 901 surrounded by a bold line and a background area 902. The extracted area 901 is extracted as an area of the cup, which is the object, and the background area 902 is an area other than the extracted area 901. Here, the extracted area is determined by a graph cut method, which will be described later.

As shown in FIG. 2, a part of the area of the table 20 is taken in as the extracted area 901 in addition to the area of the cup 10. That is, it is shown that when the R values, G values, B values are directly used as features, neighboring pixels having colors similar to one another tend to be determined as being included in the same target area. Consequently, in a situation where the object and the surrounding non-objects have colors similar to one another, it can be said that conventional area extraction directly using the R values, G values, and B values is likely to generate an error.

Therefore, in this embodiment, the value of each pixel that has been subjected to HSV conversion is also used to improve the accuracy of the area extraction. A flow of this processing will be described in order with conceptual diagrams.

Figure 3:
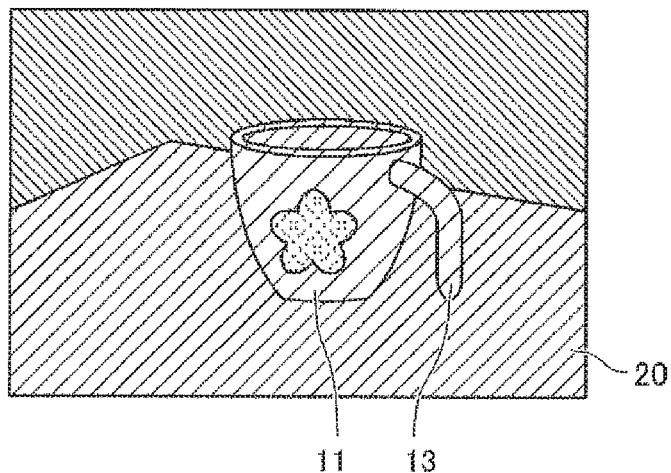
FIG. 3 is a diagram schematically showing an example of an HSV image converted from the RGB image.

FIG. 3 is a diagram schematically showing an example of an HSV image 200 converted from the RGB image 100. The HSV image is an image in which a subject is expressed in the HSV color space of hue (Hue: H value), saturation (Saturation: S value), and lightness (Value: V value). The visualized HSV image and the RGB image are visually recognized in almost the same way as long as they represent originally the same subject. However, in this embodiment, each of the H value, S value, V value converted for each pixel is treated as a simple numerical value. The illustrated HSV image 200 shows a state in which each of the converted H value, S value, and V value is visualized as if they are R value, G value, and B value, respectively.

By treating the H value, S value, and V value in this manner, for example, it is possible to generate a difference in the body part 11 and the handle 13 from the table 20. This generated difference differs from the difference in color in the RGB image. Calculation for converting the R value, G value, and B value into the H value, S value, and V value, respectively, will be described below.

It is assumed that each of the R value, G value, and B value is normalized and expressed within the range of 0 to 1. If the each of maximum R value, G value, and B value is $N_{MAX}$ and each of the smallest ones is $N_{MIN}$, in the conical model, the H value, S value, and V value are determined by Equation 1.

[Equation 1]

$$H = \begin{cases} 60 \times \dfrac{G-R}{N_{MAX} - N_{MIN}} + 60, & \text{if } N_{MIN} = B \\ 60 \times \dfrac{B-G}{N_{MAX} - N_{MIN}} + 180, & \text{if } N_{MIN} = R \\ 60 \times \dfrac{R-B}{N_{MAX} - N_{MIN}} + 300, & \text{if } N_{MIN} = G \end{cases} \quad (1)$$

$$S = N_{MAX} - N_{MIN}$$
$$V = N_{MAX}$$

Here, the H value varies from 0 to 360 and is expressed by an angle along the color wheel indicating the hue. If the H value exceeds 360, it will be a remainder of the H value divided by 360. The S value and V value are saturation and lightness varying within the range of 0 to 1, respectively.

In order to treat the H value as a simple numerical value and to express the H value within the range of 0 and 1 like the S value and V value, the H value is converted as shown in Equation 2.

[Equation 2]

$$H \leftarrow \dfrac{H}{360} \quad (2)$$

If each pixel is treated as, for example, 8-bit R value, B value, and G value and visualized, tones may be aligned as shown in Equation 3 below.

[Equation 3]

$$R = H \times 255$$
$$G = S \times 255$$
$$B = V \times 255 \quad (3)$$

FIG. 3 schematically shows an example of an image that has been expressed differently and visualized in this way. If the pixels are expressed differently in this way, the features included as hue, saturation, and lightness can be clearly manifested.

In this embodiment, the H value is made to correspond to the R value, the S value is made to correspond to the G value, and the V value is made to correspond to the B value. This combination may be changed. Any predetermined one-to-one combination between any one of the H value, S value, and V value and any one of the R value, G value, and B value may be used. In other words, the S value or the V value may be combined with the R value, the H value or the V value may be combined with the G value, and the H value or the S value may be combined with the B value.

Figure 4:
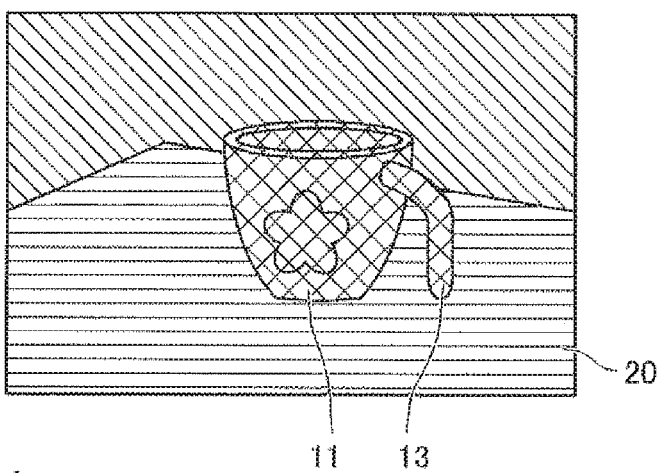
FIG. 4 is a diagram schematically showing an example of an HS'V' image that has been subject to threshold processing.

In this embodiment, the S value is converted into an S' value, and the V value is converted into a V' value by threshold processing in order to further emphasize features in the saturation and lightness. FIG. 4 is a diagram schematically showing an example of an HS'V' image 300 that has been subjected to the threshold processing.

The threshold processing is executed, for example, by each pixel using Equation 4.

[Equation 4]

$$S' = \begin{cases} 0, & \text{if } S < 64 \\ 255, & \text{if } S \geq 64 \end{cases} \quad (4)$$

$$V' = \begin{cases} 0, & \text{if } V < 64 \\ 255, & \text{if } V \geq 64 \end{cases}$$

That is, binarization processing is performed in which the S value and the V value are set to the minimum value 0 or the maximum value 255. In this case, in order to emphasize the features of the saturation and lightness to their maximum, the binarized values are the minimum value 0 and the maximum value 255. However, the S value and the V value may be adjusted to other values depending on the targeted degree of the emphasis. Further, for example, when the S value is less than 64, the binarization may be performed by inverting and setting the S' value to 255. Furthermore, although 64 is used as a threshold in this case, the S value may be adjusted to other values.

In this way, by appropriately setting the threshold and performing the binarization processing, it is possible to emphasize the difference between the lightness and saturation between the areas. FIG. 4 schematically shows an example of an image in which the H value, S' value, and V' value have been subjected to processing similar to the visualization processing described with reference to FIG. 3. It can be seen that in this example, the difference of the body part 11 and the handle 13 from the table 20 is clearly shown.

In this embodiment, the threshold processing may be performed on one or both of the S value and V value. If the difference between the areas is not emphasized in the lightness between areas, only the S value may be converted into the S' value. If the difference between the areas is not emphasized in the saturation, only the V value may be converted into the V' value.

Figure 5:
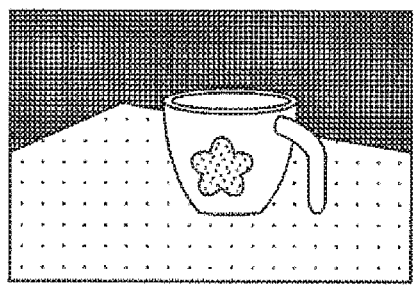
FIG. 5 is a diagram schematically showing an example of generation of a composite image.
Figure 5:
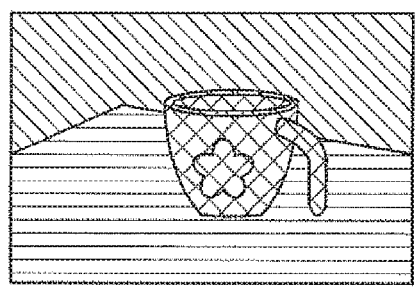
Figure 5:
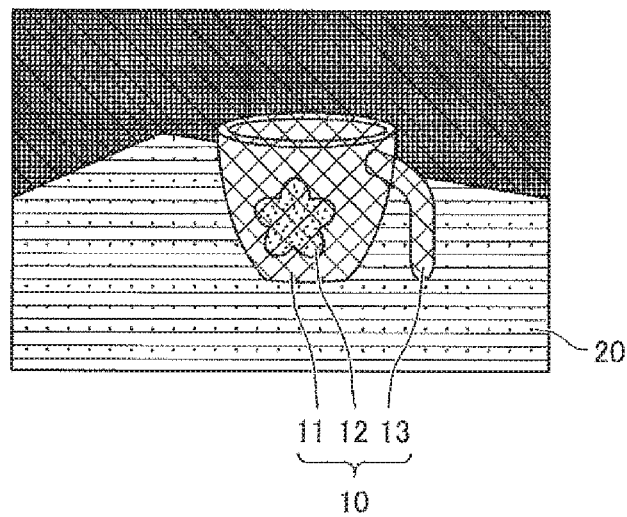

Next, the R value, G value, and B value of each pixel in the RGB image 100 are combined with the H value, S' value, and V' value of each pixel in the HS'V' image 300 to generate a composite image 400. FIG. 5 is a diagram schematically showing an example of generation of the composite image 400. The combining process is performed, for example, for each pixel using Equation 5.

[Equation 5]

$$X = \dfrac{R + H}{2} \quad (5)$$
$$Y = \dfrac{G + S'}{2}$$
$$Z = \dfrac{B + V'}{2}$$

The X value, Y value, and Z value are combined color information of each combined pixel. As described above, in this embodiment, the H value is made to correspond to the R value, the S' value is made to correspond to the G value, and the V' value is made to correspond to the B value. However, the combinations are not limited to this.

FIG. 5 shows the composite image 400 schematically showing an example in which processing similar to the visualization processing described with reference to FIG. 3 is performed on the X values, Y values, and Z values. In this example, it is shown that the features of the saturation and lightness are superimposed on the features of RGB color information.

Figure 6:
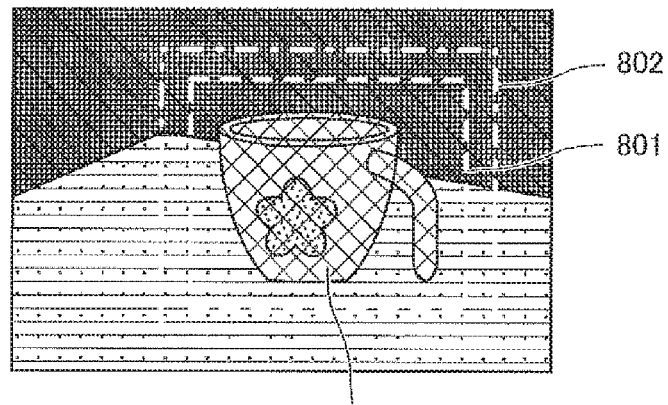
FIG. 6 is a diagram schematically showing preprocessing of extraction processing.

Extraction processing for extracting an image area of the object is performed on this composite image 400. FIG. 6 is a diagram schematically showing preprocessing of the extraction processing. First, the calculation unit sets an initial area 801 as an area including the object (in this case, the cup 10) using the matching method or the like. Further, the calculation unit sets a peripheral area 802 surrounding the initial area 801. In this case, the peripheral area 802 is set to 1.3 times the initial area 801.

The calculation unit executes extraction calculation on the object area by the Grabcut (graph cut method) using the initial area 801 and the peripheral area 802 set as described above. The Grabcut is a method suggested in "2004 Conference on Computer Graphics and Interactive Techniques (SIGGRAPH)", "Interactive Foreground Extraction using iterated graph cuts" and the like.

Figure 7:
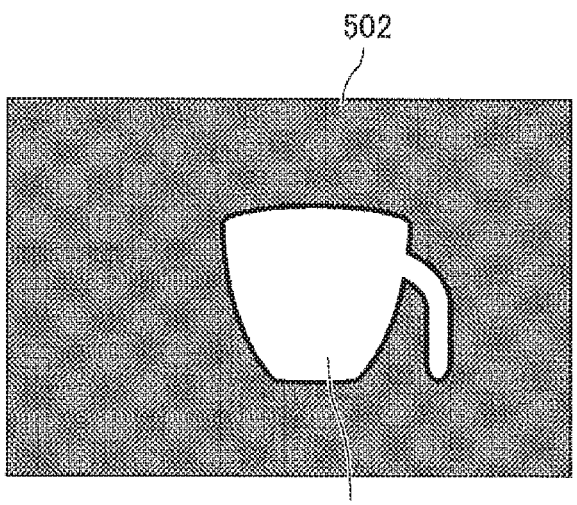
FIG. 7 is a diagram schematically showing an example where an area is extracted from the composite image.

FIG. 7 is a diagram schematically showing an example of extracting an area of the object from the composite image 400. A result of the output is shown as a segmented image 500. The segmented image 500 is segmented into an extracted area 501 that is extracted as the object and a background area 502 that is an area other than the extracted area 501. By emphasizing and adding the features of the lightness and saturation using the composite image 400 as in this embodiment, it is possible to cut out only the area of the object with high accuracy as shown in the drawing. Note that the area extraction method using the composite image is not limited to the graph cut method, and instead other methods may be employed. However, as a result of repeated demonstration experiments, it was found that when the graph cut method using the composite image according to this embodiment was used, the object area could be extracted relatively satisfactorily.

Figure 8:
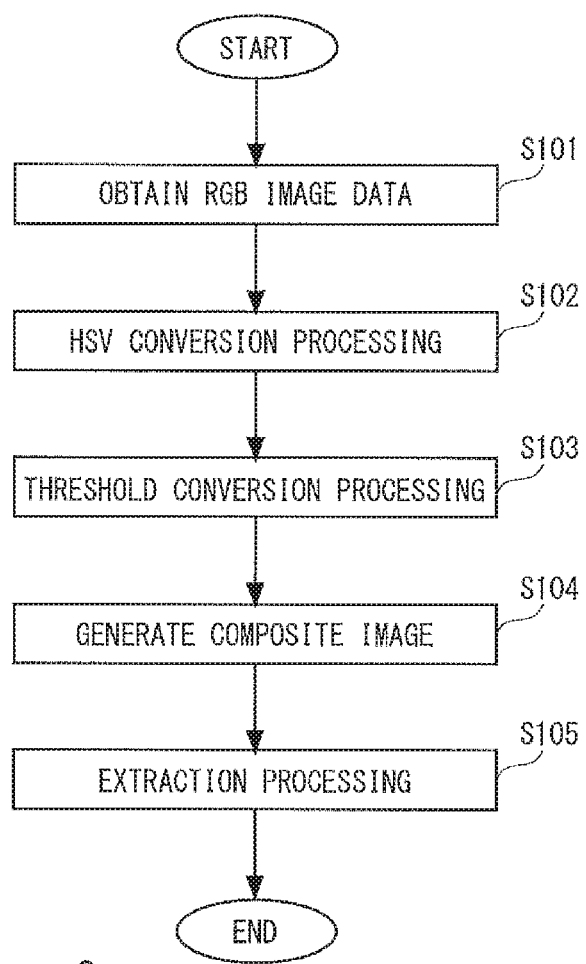
FIG. 8 is a flowchart showing an entire procedure of image area extraction.

Although each process has been described above using the schematic diagrams, it will be explained again as an entire process procedure executed by the calculation unit. FIG. 8 is a flowchart showing an entire procedure of the image area extraction.

In Step S101, the calculation unit obtains the RGB image data. The calculation unit may control the imaging unit to capture an image or may obtain already captured image data from an external device via a network.

Next, in Step S102, the calculation unit executes the HSV conversion processing. In the HSV conversion processing, the R value, G value, and B value in each pixel of the RGB image are converted into the H value, S value, and V value, respectively. More specifically, the processing described with reference to FIG. 3 is executed. Next, in Step S103, the calculation unit executes the threshold conversion processing on the S value and V value to convert them into the S' value and V' value, respectively. More specifically, the processing described with reference to FIG. 4 is executed.

Further, the calculation unit combines the RGB image data obtained in Step S101 and the HS'V' image data generated in Step S103 (Step S104). Specifically, as described with reference to FIG. 5, for each pixel, the R value and H value are added, the G value and the S' value are added, and the B value and the V' value are added, and the added values will become the X value, Y value, and Z value, respectively.

The calculation unit performs the extraction processing on the composite image generated in Step S104 (Step S105). In the extraction processing, as described above, the object is extracted with high accuracy when the graph cut method is used. The calculation unit outputs the extracted area and ends the series of processing. After that, the production robot evaluates the posture of the cup using the output of the extracted area, and proceeds to execute the operation of holding the cup.

In the above-described embodiment, the R value, G value, and B value are added to the H value, S' value, and V' value, respectively, without weighting the values. However, the R value, G value, and B value and the H value, S' value, and V' value may be multiplied by weighting coefficients and then added. The above Equation 5 may be expressed using weighting coefficients α and β (where α+β=1) as shown in Equation 6.

[Equation 6]

$$X = \frac{\alpha R + \beta H}{2}$$
$$Y = \frac{\alpha G + \beta S'}{2}$$
$$Z = \frac{\alpha B + \beta V'}{2}$$
(6)

By setting the weighting coefficients in this way, it is possible to make an adjustment as to whether to emphasize the RGB color information or the saturation and lightness information of HS'V'. Furthermore, level adjustment may be performed by adding constant terms to each value.

Such adjustment of the weighting coefficients can be performed, for example, based on histograms of the R value, G value, and B value. For example, when the histogram distribution of the R value, the distribution of the histogram of the G value, and the distribution of the histogram of the B value are relatively uniform, it is difficult to distinguish between the areas in the color information. In such a case, the saturation and lightness information may be prioritized and β may be increased.

The program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. An image area extraction method for extracting an image area of an object from a color image of obtained color image data, the image data extraction method comprising:

converting RGB values of each pixel in the color image data into HSV values;

performing threshold processing to binarize at least one of the converted S and V values of each pixel so that it will be converted into HS'V' values;

generating composite image data including an X value, a Y value, and a Z value for each pixel, the X value, the Y value, and the Z value being obtained by adding values according to predetermined one-to-one combinations between any one of an R value, a G value, and a B value and any one of an H value, an S' value, and a V' value; and extracting the image area using the composite image data.

2. The image area extraction method according to claim 1, wherein in the generating, the RGB values and HS'V' values are multiplied by weighting coefficients and then added.

3. The image area extraction method according to claim 2, wherein in the generating, the weighting coefficients are changed based on histograms of the RGB values.

4. The image area extraction method according to claim 1, wherein in the extracting, the image area is extracted by a graph cut method.

5. A non-transitory computer readable medium storing an image area extraction program for extracting an image area of an object from a color image of obtained color image data, the image area extraction program causing a computer to execute:

converting RGB values of each pixel in the color image data into HSV values;

performing threshold processing to binarize at least one of the converted S and V values of each pixel so that it will be converted into HS'V' values;

generating composite image data including an X value, a Y value, and a Z value for each pixel, the X value, the Y value, and the Z value being obtained by adding values according to one-to-one combinations between any one of an R value, a G value, and a B value and any one of an H value, an S' value, and a V' value; and extracting the image area using the composite image data.

* * * * *